May 5, 1942.  M. W. KIBRE  2,281,978
CONTINUOUS VAPOR PRESSURE APPARATUS
Filed March 26, 1940

M. W. KIBRE
INVENTOR
ATTORNEY

Patented May 5, 1942

2,281,978

UNITED STATES PATENT OFFICE 2,281,978

CONTINUOUS VAPOR PRESSURE APPARATUS

Martin W. Kibre, Whittier, Calif.

Application March 26, 1940, Serial No. 326,024

4 Claims. (Cl. 73—51)

The object of the invention is to make a continuous record of the vapor pressure of a flowing stream of a volatile liquid, such as gasoline, in such manner as to avoid the necessity for correcting the reading for variations in temperature of the stream or even for making any record of the temperature.

In its essence the invention consists of a closed vessel in which is maintained a continuously withdrawn and replenished body of the liquid to be tested, a sealed reservoir containing a suitable quantity of a generally similar liquid of which the vapor pressure is known, and a differential pressure gauge connected on its opposite sides to the vapor spaces of the vessel and the reservoir respectively.

An illustrative embodiment of the invention is shown in the attached drawing, in which—

Figure 1:
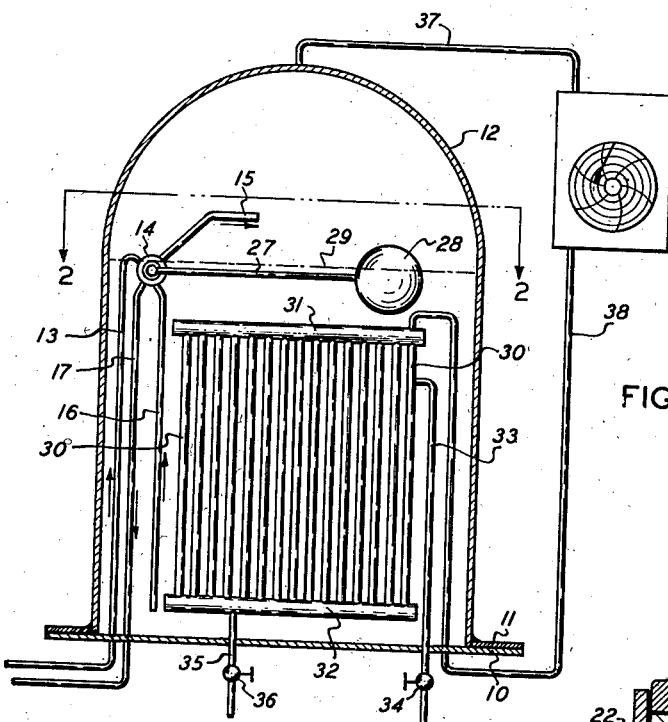
Fig. 1 is a vertical view partly in section of the assembled apparatus.

Referring to the figures, 10 is a base plate, 11 a ring bolted thereto, and 12 a bell welded at its edges to the ring, the whole forming a closed vessel capable of retaining a volatile liquid under pressure without leakage. This vessel is supplied with a flow stream of the liquid of which the vapor pressure is to be recorded through a pipe 13 communicating with any source of supply, such for example as the run-down pipe of a gasoline still. This pipe is connected through a level control valve 14, which will be described, to an outlet pipe 15 discharging into the upper portion of the bell.

An outlet pipe 16 terminates in an open end near the bottom of the bell and is likewise connected into level control valve 14 and through it to a discharge pipe 17 sealed into the bottom plate and connected outside the apparatus to any convenient point of discharge of the tested stream.

Figure 4:
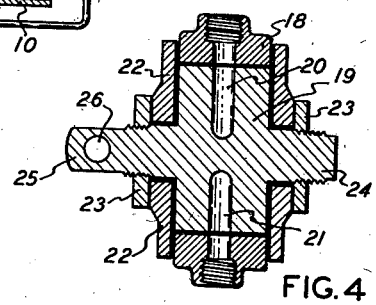
Figs. 3 and 4 are details of the liquid level control valve 14, in cross section and longitudinal section respectively.
Figure 2:
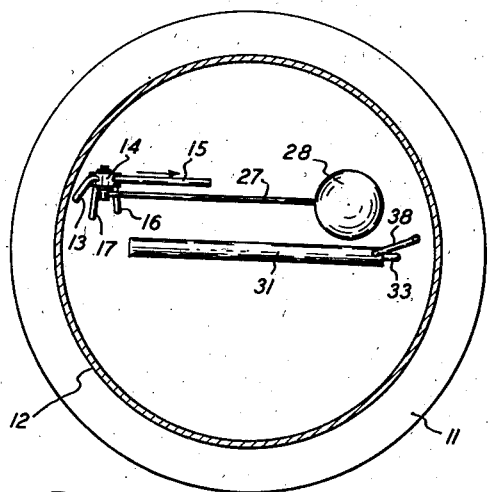
Fig. 2 is a horizontal section taken on the line 2—2 of Fig. 1.
Figure 3:
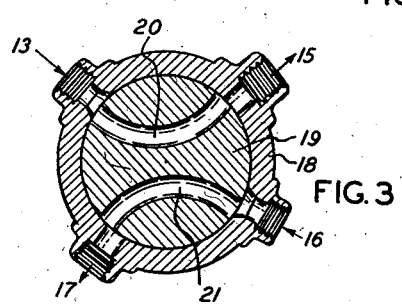

A suitable construction for valve 14 is shown in Figs. 3 and 4. A casing 18 is provided with four ports having threaded outlets for connection to the four pipes 13, 15, 16, and 17 as indicated in Fig. 3. A rotatable plug 19 is ground into the core and is provided with two channels 20 and 21 which place port 13 in communication with port 15 and/or port 16 in communication with port 17. The channels are so located that when the passage 13—20—15 is fully open, the passage 16—21—17 is closed, and vice versa, while in a medial position, both passages are partly open. The plug is retained in position in any preferred manner, as by washers 22—22 and nuts 23—23, the plug having threaded stems 24 and 25, the latter being drilled as at 26 to receive a rod 27 carrying at its outer end a float 28 (Fig. 1).

The position of the float in relation to the plug of the valve is so adjusted that when the plug is in the medial position of rotation, with equal openings through the two passages, the liquid level 29 in the bell leaves 15% vapor space while 85% of the net capacity of the bell is filled with liquid. Then if the level rises, inlet passage 13—20—15 is decreased and outlet passage 16—21—17 is increased in area by the rising of the float, and vice versa, thus maintaining a substantially constant liquid level. It will be observed that this particular 4-way valve is illustrative only and that any preferred constant level device may be substituted.

Within the bell and preferably completely submerged in the liquid therein is placed a sealed reservoir for holding the comparison fluid. This reservoir may be of any preferred form, but for rapid equalization of temperature it should expose a relatively large amount of surface as related to volume capacity and it should be made of copper or other metal having high heat conductivity. A simple form is that shown in Fig. 1, in which a plurality of riser pipes 30—30 are sealed into header tubes 31 and 32. One of the risers is branched as at 33 and the branch pipe is carried through plate 10 and provided with a valve or cock 34. This branch should be so placed that when the standard liquid is injected into the reservoir (as through pipe 35 and valve 36), it will overflow when filled to 85% of its total capacity.

Finally, the vapor space within the bell is connected by a tube 37, and the vapor space within the reservoir by a tube 38, with the two sides of a differential pressure gauge 39, which may be either indicating or recording.

This apparatus is used in the following manner. First, a reference fluid is selected which is of the same general character as the fluid to be tested. For example, if the apparatus is to be operated on the stabilized gasoline from the bottom of a stabilizer, a relatively large sample of this material is taken and its vapor pressure determined by standard methods—as for example the Reid vapor pressure at 100° F. is determined in pounds absolute. Both the bell and the reservoir are then filled to the 85% level with this liquid, the filling and overflow valves closed, and the differential gauge connected. After sufficient time for the temperatures to fully equalize, the pointer or free arm is adjusted to point either to the figure already determined or to the zero point on the scale. The standard fluid is then drained from the bell but retained in the reservoir, the bell is filled with the fluid to be tested, and a continuous slow stream of this fluid passed through it. As soon as the temperatures have again equalized, the differential gauge will (ordinarily) show a different reading, which may be greater or less than that to which it was set. If the original setting was at the zero mark, the vapor pressure of the gasoline will be the vapor pressure of the standard liquid plus or minus the new reading. If the original setting was at the vapor pressure of the standard liquid, the new reading will be the vapor pressure of the liquid in the bell, without calculation.

It would be possible to obtain the same result without the use of a differential gauge by connecting the bell and the reservoir with individual pressure gauges. In this case the vapor pressure of the liquid being tested would be obtained by subtracting the momentary reading of the reservoir gauge from the momentary reading of the bell gauge and adding the (plus or minus) difference to the known vapor pressure of the standard liquid.

This operation is based on the assumption that the effects of temperature changes on the vapor pressures of the two liquids are the same, and experience indicates that when the standard liquid and the test liquid are of the same character and do not vary too widely in vapor pressure, the accuracy of the test over a rather wide range of temperature is within the limits of accuracy of a good differential pressure gauge. It will be understood that the readings are self-correcting and that no correction for temperature need be applied. The liquid capacity of the bell should be sufficiently large that the rate of temperature change in the liquid body will not exceed the rate of heat transfer between this liquid and the liquid in the reservoir, as a serious error may be introduced if the temperatures of the two liquids are not substantially the same at all times.

I claim as my invention:

1. Apparatus for continuously ascertaining the vapor pressure of a volatile liquid which comprises: a substantially closed vessel; means for flowing a stream of said liquid through said vessel and for maintaining a body of said liquid at substantially constant level partially filling said vessel; a reservoir formed of heat conductive metal arranged to be submerged in said liquid body, said reservoir being partially filled with a liquid of known vapor pressure, and means for indicating the momentary difference between the vapor pressures existing respectively in said vessel and said reservoir.

2. Apparatus for continuously ascertaining the vapor pressure of a volatile liquid which comprises: a substantially closed vessel; means for flowing a stream of said liquid through said vessel and for maintaining a body of said liquid at substantially constant level partially filling said vessel; a reservoir formed of heat conductive metal arranged to be submerged in said liquid body, said reservoir being partially filled with a liquid of known vapor pressure, and means for indicating the momentary difference between the vapor pressures existing respectively in said vessel and said reservoir, said means comprising a differential pressure gauge.

3. Apparatus for continuously ascertaining the vapor pressure of a volatile liquid which comprises: a substantially closed vessel; means for flowing a stream of said liquid through said vessel and for maintaining a body of said liquid at substantially constant level partially filling said vessel; a reservoir, arranged to be submerged in said liquid body, formed of a plurality of tubes of heat conductive metal and a header communicating with the upper ends of said tubes, said tubes being partially filled with a liquid of known vapor pressure; and means for indicating the momentary difference between the vapor pressures existing respectively in said vessel and said reservoir.

4. Apparatus for continuously ascertaining the vapor pressure of a volatile liquid which comprises a substantially closed vessel; means for flowing a stream of said fluid through said vessel and for maintaining a body of said liquid at substantially constant level partially filling said vessel; a reservoir formed of heat-conductive metal arranged to be partially submerged in said liquid body, said reservoir being partially filled with a liquid of known vapor pressure and means movable in response to changes in vapor pressure in the vapor spaces existing above the liquid level in said closed vessel and reservoir for indicating the existing pressure relationship between said spaces.

MARTIN W. KIBRE.